(12) United States Patent
Usui

(10) Patent No.: US 6,414,986 B1
(45) Date of Patent: Jul. 2, 2002

(54) METHOD AND SYSTEM FOR RADIO COMMUNICATION

(75) Inventor: Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/377,748

(22) Filed: Aug. 20, 1999

(30) Foreign Application Priority Data

Aug. 24, 1998 (JP) ............................................. 10-237383

(51) Int. Cl.[7] .............................. H04J 13/04; H04L 7/04
(52) U.S. Cl. ...................... 375/142; 375/145; 375/356; 370/328; 370/441; 455/426; 455/517
(58) Field of Search ................................. 375/130, 153; 370/328, 441; 455/426, 517

(56) References Cited

U.S. PATENT DOCUMENTS

| | | | |
|---|---|---|---|
| 5,046,066 A | 9/1991 | Messenger | 370/94.1 |
| 5,297,144 A | 3/1994 | Gilbert et al. | 370/95.2 |
| 5,408,506 A | 4/1995 | Mincher et al. | 375/356 |
| 5,712,870 A | 1/1998 | Petrick | 375/206 |
| 5,903,618 A | 5/1999 | Miyake et al. | 375/356 |
| 6,151,352 A * | 11/2000 | Taki et al. | 375/132 |
| 6,259,722 B1 * | 7/2001 | Dicker et al. | 375/132 |

* cited by examiner

Primary Examiner—Amanda T. Le
(74) Attorney, Agent, or Firm—Jay H. Maioli

(57) ABSTRACT

In a method for radio communication of exchanging a transmission signal, which has been modulated by a prescribed method based on information data, between plural communication terminals and controlling the plural communication terminals by a control terminal, the control terminal generates a first code sequence to synchronize with the plural communication terminals, and transmits it to the plural communication terminals. The communication terminal synchronizes with the control terminal based on a reference timing obtained by receiving the first code sequence, generates a second code sequence representing the demodulation timing for the transmission signal and transmits it to another communication terminal out of the plural communication terminals, and then transmits the transmission signal to the other communication terminal. The other communication terminal demodulates the transmission signal, which is received following the second code sequence, based on the demodulation timing obtained by receiving the second code sequence.

16 Claims, 12 Drawing Sheets

METHOD AND SYSTEM FOR RADIO COMMUNICATION

BACKGROUND OF THE INVENTION

1. Field of the Invention

The present invention relates to a radio communication method and a radio communication system, and more particularly, is suitably applied to a wireless local area network (LAN) system having plural communication terminals connected to each other by radio, for example.

2. Description of the Related Art

There is a cable LAN system having a LAN constructed by connecting plural computers to each other by cables. In this cable LAN system, the plural computers can share files or data, and also can forward electronic mails or data to each other.

However, in construction of such LAN system, a complicated construction to mutually connect the plural computers is necessary, and a system configuration is complicated because various cables are needed for connecting. Recently, then, the system is turning from a cable LAN system to a wireless LAN system.

For this wireless LAN system, a system has been proposed, in which terminals send/receive data to/from each other using a transmission signal generated by performing spectrum diffusion on transmission data in the form of a diffusion code being a pseudonoise code (e.g., a pseudo random noise (PN) code)) (hereinafter, this system is referred to as a spectrum diffusion system).

Such the wireless LAN system using the spectrum diffusion system multiplies a PN code by the transmission signal to diffuse over a wide band, and transmits the transmission signal by a radio wave having a low power density. Since the transmission is performed by a radio wave with a small power density, the spectrum diffusion system has characteristics in which the transmission has little influence on terminals which do not communicate and also the transmission is hard to be influenced by other terminals because of performing diffusion and inverse-diffusion using a PN code.

Moreover, in the spectrum diffusion system, a receiving end can demodulate a transmission signal only by multiplying a diffusion code having the same sequence pattern and the same phase as one used by a transmitting end by a reception signal for the inverse-diffusion processing. Therefore, it is superior in a secret story and has a great effect of security against wiretapping.

By the way, as shown in FIG. 1, a wireless LAN system 1 of the spectrum diffusion system having the above configuration is composed of plural communication terminals 2 and 3 and a communication terminal controller 4 for controlling the communication terminals 2 and 3. The communication terminal controller 4 is prescribed distances L1 and L2 away from the communication terminals 2 and 3 respectively.

To synchronize with the communication terminals 2 and 3, as shown in FIG. 2, the communication terminal controller 4 transmits a PN code PN1 having a prescribed code sequence pattern to the communication terminals 2 and 3, which are different in distance from the controller 4, at the timing of the head of frames. The communication terminals 2 and 3 receive the PN code PN1 after delay times $\Delta t1$ and $\Delta t2$ that correspond to the distances L1 and L2 from the communication terminal controller 4.

For instance, as shown in FIG. 3, when the communication terminal controller 4 transmits the PN code PN1 to the communication terminal 2 at the timing of the head of frame, the communication terminal 2 receives the PN code PN1 after the delay time $\Delta t1$ (=approximately 33 nsec). Then, the communication terminal 2 transmits packet data PD1 including desired information data to the communication terminal controller 4 a time assigned to transmit $T_{X1}$ after reception.

In this case, the communication terminal controller 4 receives the packet data PD1, sent from the communication terminal 2 being the distance L1 away therefrom, after a delay time $T_{TX1'}$ that is obtained by adding a delay times for transmitting and receiving $2\times\Delta t1$ to the time assigned to transmit $T_{TX1}$, since it takes the delay time $\Delta t1$ to transmit data with the communication terminal 2.

Also, it is not shown but, the communication terminal controller 4 receives packet data PD2, sent from the communication terminal 3, after a delay time $T_{TX2'}$ that is calculated by adding delay times for transmitting and receiving $2\times\Delta t2$ to the time assigned to transmit $T_{TX2}$.

Accordingly, the communication terminal controller 4 receives the packet data PD1 and PD2 from the communication terminals 2 and 3 at separate timings. As a result, in the case of expecting that the packet data PD1 and PD2 will be received at fixed timings, if the packet data PD1 and PD2 are demodulated at the expected timing, the controller 4 had a problem in that the error of receiving timing would cause a demodulation error.

With respect to an error of receiving timing $2\times\Delta ti$ (i=1 or 2), for instance, if a transmission rate in transmitting is approximately 30 Mbps, an error $2\times\Delta ti$ ($2\times33$ nsec) to the bit length of transmission data becomes an extremely high value; a demodulation error will occur definitely.

Furthermore, data communication between the communication terminal 2 and 3 also had a problem that an error of receiving timing would cause a similar demodulation error.

SUMMARY OF THE INVENTION

In view of the foregoing, an object of this invention is to provide a radio communication method and a radio communication system capable of always accurately demodulating data.

The foregoing object and other objects of the invention have been achieved by the provision of a method for radio communication for exchanging a transmission signal modulated by a prescribed method based on information data between plural communication terminals and for controlling the plural communication terminals by a control terminal. In this method, the control terminal generates and transmits a first code sequence used for making the control terminal synchronize with the plural communication terminals, to the plural communication terminals, the communication terminal synchronizes with the control terminal based on a reference timing obtained by receiving the first code sequence, generates and transmits a second code sequence that represents a demodulation timing of a transmission signal, to another communication terminal out of the plural communication terminals, and then, transmits the transmission signal to the other communication terminal after the second code sequence, and the other communication terminal demodulates the transmission signal received following the second code sequence based on the demodulation timing of receiving the second code sequence.

The communication terminal synchronizes with the control terminal based on the first code sequence sent from the control terminal, transmits the second code sequence representing the demodulation timing of the transmission signal to the other communication terminal, and then transmits the transmission signal to the other communication terminal after the above second code sequence, so that the other communication terminal can accurately demodulate the received transmission signal, provided that it starts demodulation processing based on the demodulation timing of receiving the second code sequence.

In a radio communication system composed of plural communication terminals which exchange a transmission signal modulated by a prescribed method based on information data with each other and a control terminal for controlling the plural communication terminals, the control terminal comprises a first code sequence generating means for generating a first code sequence used to make the control terminal synchronize with the plural communication terminals, and a first transmission means for transmitting the first code sequence to the plural communication terminals, and each communication terminal comprises a second code sequence generating means for generating a second code sequence that represents a demodulation timing of the transmission signal, a modulating means for performing prescribed modulation based on information data to generate a transmission signal, a second transmission means for transmitting the second code sequence and then transmitting the transmission signal following the above second code sequence, a receiving means for receiving the first code sequence, the second code sequence and the transmission signal, a correlation detecting means for detecting the first code sequence and the second code sequence received by the receiving means, and a demodulating means for synchronizing with the control terminal based on a reference timing of detecting the first code sequence with the correlation detecting means, and for demodulating the transmission signal based on the demodulation timings of detecting the second code sequence.

The control terminal generates and transmits the first code sequence to the plural communication terminal to synchronize with them. After that, a communication terminal transmits the second code sequence representing the demodulation timing of the transmission signal to another communication terminal, and then transmits the transmission signal demodulated based on the information data. Thereby, the other communication terminal can always accurately demodulate the received transmission signal, provided that it starts demodulation processing based on the demodulation timing of receiving the second code sequence.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1:
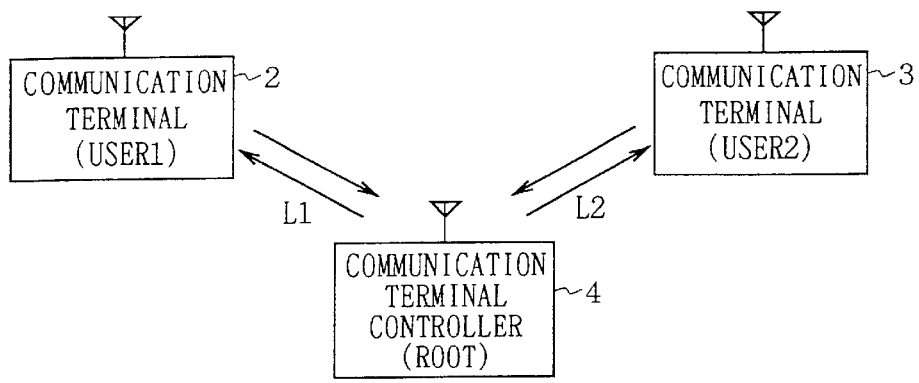
FIG. 1 is a schematic diagram showing the configuration of a wireless LAN system according to a related art.
Figure 2:
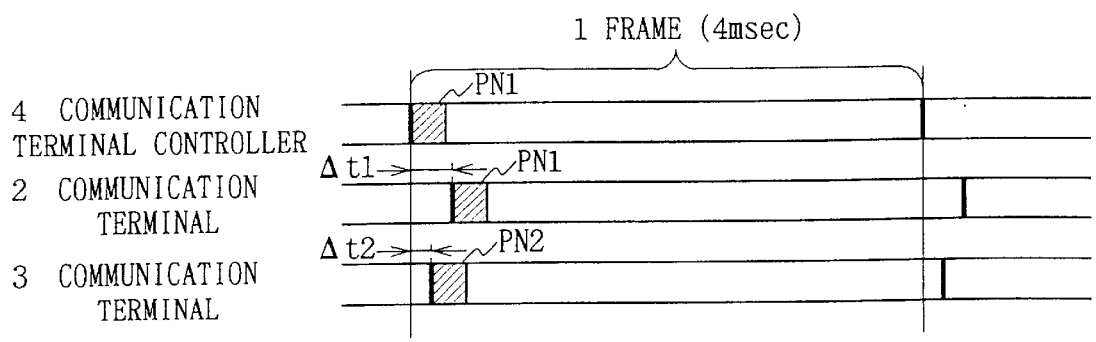
FIG. 2 is a schematic diagram showing receiving timings according to a related art.
Figure 3:
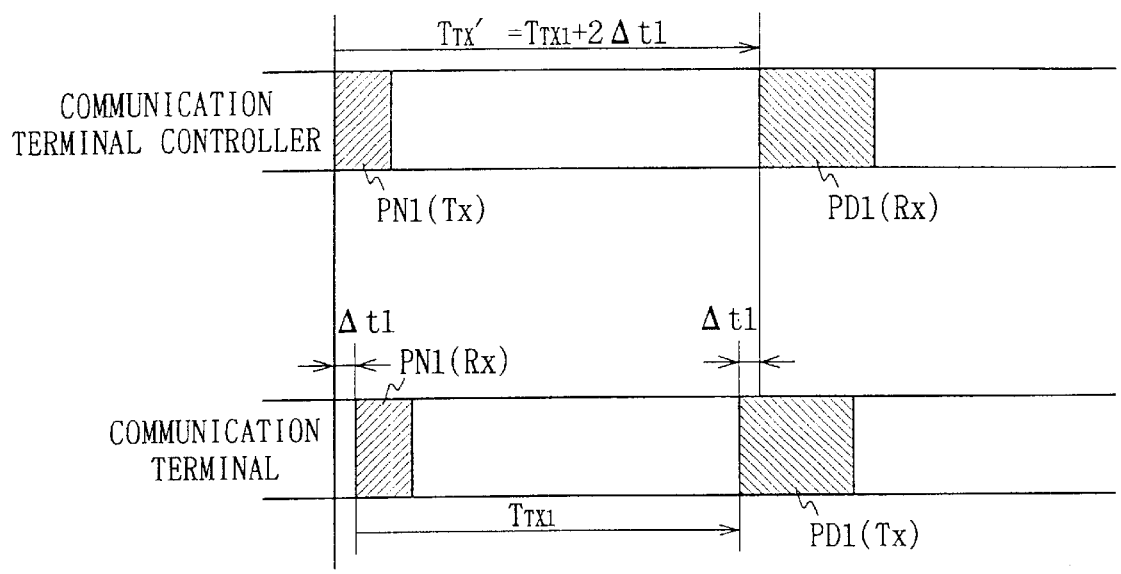
FIG. 3 is a schematic diagram showing receiving timings in a communication terminal controller according to a related art.
Figure 4:
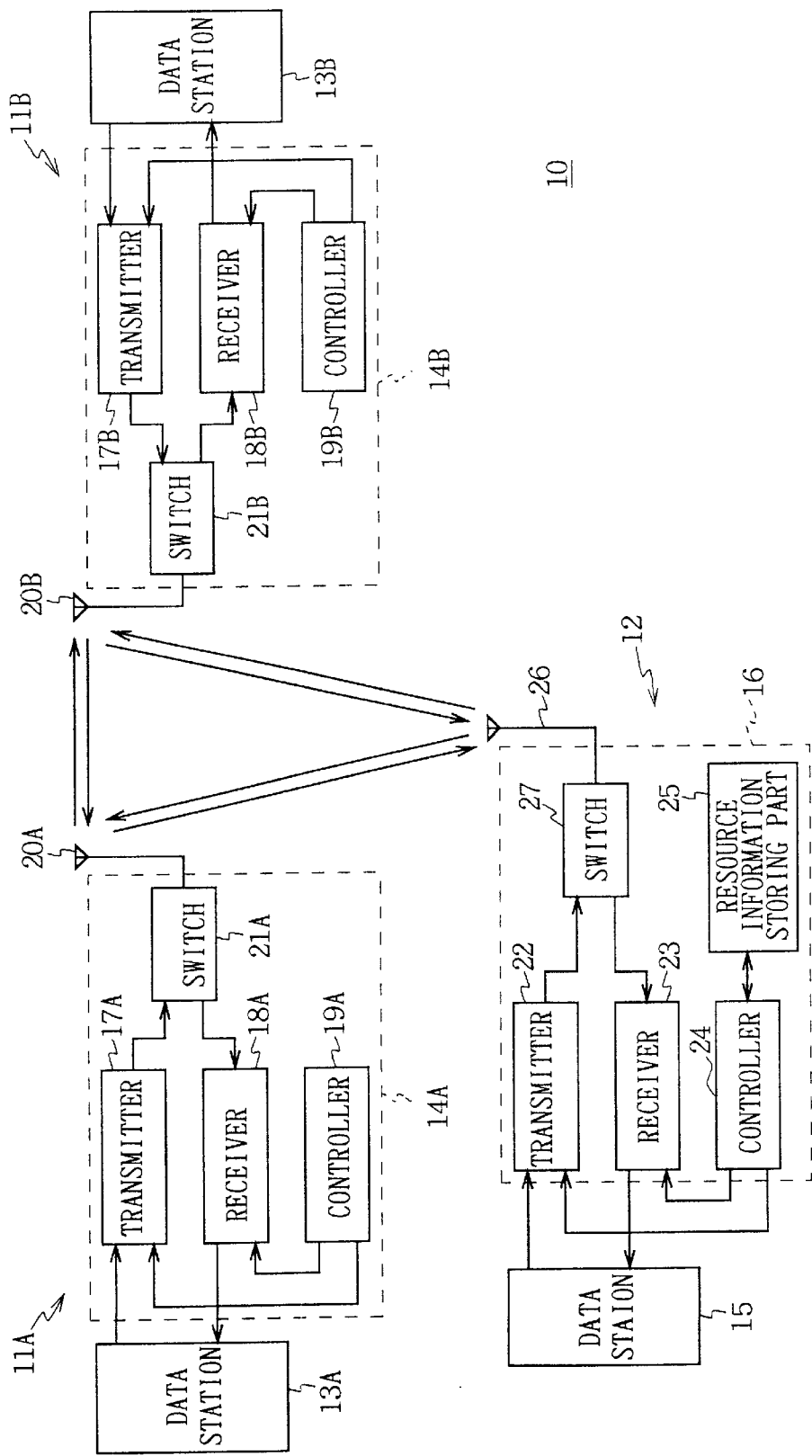
FIG. 4 is a block diagram showing the general configuration of a wireless LAN system according to the present invention.

Preferred embodiments of the present invention will be described with reference to the accompanying drawings:
(1) General Configuration of Wireless LAN System Referring to FIG. 4, numeral 10 generally shows a wireless LAN system as a radio communication system to which the present invention is applied. The wireless LAN system 10 is composed of plural communication terminals 11A, 11B and a communication terminal controller 12 roughly. When data is exchanged between the units, exchanging is performed by alternately transmitting and receiving data with the same frequency, by so-called time division duplex (TDD) scheme.

In these communication terminals 11A, 11B, radio communication units 14A, 14B are connected to data stations 13A, 13B being computers or the like, respectively. Similarly, also in the communication terminal controller 12, a radio communication unit 16 is connected to a data station 15 being a computer or the like.

In this wireless LAN system 10, data is exchanged between the communication terminals 11A and 11B, and the communication terminal controller 12 controls the data communication between them and at the same time, transmits information data to the communication terminals 11A and 11B. Practically, in the wireless LAN system 10, the communication terminal controller 12 transmits information data obtained through, e.g., the Ethernet or the like, to the communication terminals 11A and 11B, to exchange data with various kinds of home audio visual (AV) devices (e.g. TV, FAX, VTR, etc.) each connected to the communication terminal 11A or 11B by a communication interface such as IEEE 1394.

The radio communication unit 14A provided in the communication terminal 11A is formed of a transmitter 17A, a receiver 18A, a controller 19A, an antenna 20A and an antenna switcher 21A. Similarly, the radio communication unit 14B provided in the communication terminal 11B is formed of a transmitter 17B, a receiver 18B, a controller 19B, an antenna 20B and an antenna switcher 21B.

The transmitters 17A and 17B and the receivers 18A and 18B exchange data by radio by the orthogonal frequency division multiplexing (OFDM) system. This OFDM scheme transmits data in parallel with plural orthogonal subcarriers; transmission rate can be easily raised, and demodulation can be performed without error even if jitters occur.

Now, the radio communication unit 16 provided in the communication terminal controller 12 has a resource information storing part 25 for storing resource information (so-called, time slot information in a prescribed time duration) concerning a time assigned to transmit of the time when each of the communication terminals 11A and 11B performs data communication.

In the wireless LAN system 10, it is defined that one frame is equal to 147,455 symbols (it corresponds to 4[msec]). Information data is transmitted by a time division multiple access (TDMA) method within that frame.

In the head of the frame, a first PN code for obtaining synchronization is transmitted from the radio communication unit 16 of the communication terminal controller 12. The first PN code for obtaining synchronization is received by the radio communication units 14A and 14B of the communication terminals 11A and 11B. Transmitting/receiving timing for exchanging data between the communication terminal controller 12 and the communication terminals 11A and 11B, and transmitting/receiving timing for exchanging data between the communication terminals 11A and 11B are set on the basis of that receiving timing.

Specifically, in the wireless LAN system 10, when the communication terminals 11A and 11B request for data communication, a request for transmission is sent to the radio communication unit 16 of the communication terminal controller 12 from the radio communication units 14A and 14B of the communication terminals 11A and 11B.

The radio communication unit 16 of the communication terminal controller 12 determines a time assigned to transmit to the communication terminals 11A and 11B based on the sent request for transmission and the resource information, and transmits control information including that time assigned to transmit to the radio communication units 14A and 14B of the communication terminals 11A and 11B.

Thereby, the radio communication units 14A and 14B exchange data at the timing of a prescribed timing slot according to the time assigned to transmit. In this connection, data is exchanged between the radio communication units 14A and 14B at a transmitting/receiving timing on the basis of the first PN code for obtaining synchronization supplied with the head of one frame as described above.

(2) Radio Communication Unit of Communication Terminal Controller

Figure 5:
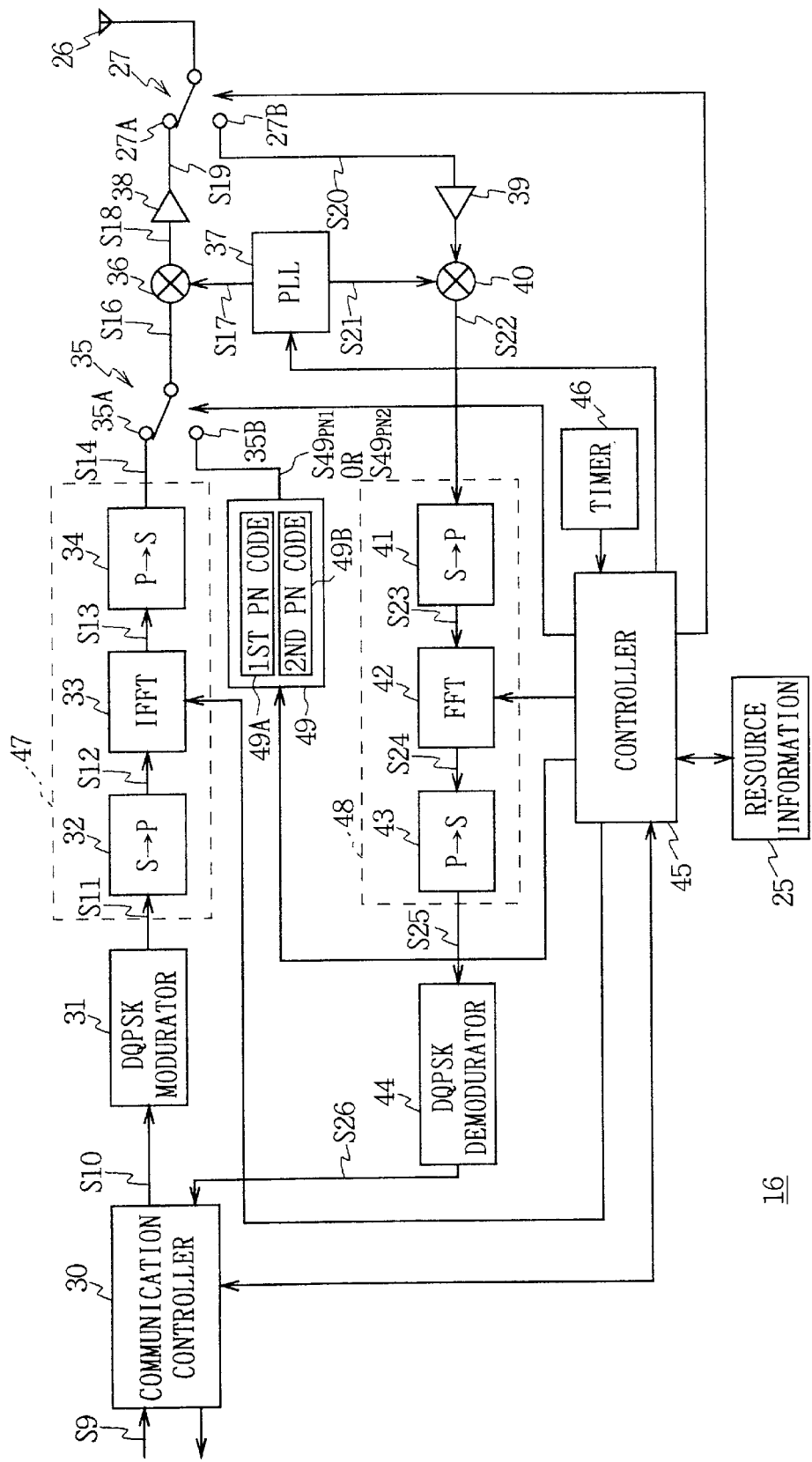
FIG. 5 is a block diagram showing the configuration of the radio communication unit of a communication terminal controller.

Hereinafter, the radio communication unit 16 provided in the communication terminal controller 12 will be described with reference to FIG. 5. This radio communication unit 16 has a communication controller 30 to exchange data with the data station 15 via the above communication controller 30.

The communication controller 30 adds a cyclic redundancy check (CRC) code for error correction to information data S9 representing message information, sent from the data station 15 to generate transmission data S10, and then sends this to a DQPSK modulator 31. The DQPSK modulator 31 performs DQPSK modulation on the transmission data S10 to generate a transmission signal S11, and then sends this to the serial-parallel converter 32 of an OFDM modulator 47.

The serial-parallel converter 32 converts the transmission signal S11 supplied in the form of serial data sequence into a transmission signal S12 in the form of parallel data sequence, and sends this to an inverse fast Fourier transformer (IFFT) 33. The IFFT 33 performs inverse fast Fourier transform on the transmission signal S12 to map the parallel data sequence of the transmission signal S12 onto data in the frequency area, and sends thus obtained transmission signal S13 to a parallel-serial converter 34.

The parallel-serial converter 34 restores the transmission signal S13 in the form of the parallel data sequence, mapped on the frequency area, into the serial data sequence, and sends thus obtained transmission signal S14 to a switch 35. Practically, this OFDM modulator 47 uses plural subcarriers which have frequency difference $f_0$ each other and which cross at right angles each other so as to prevent inter-code interference, and allocates a signal with a low bit rate to the each subcarrier to obtain a high bit rate as a whole.

Figure 6:
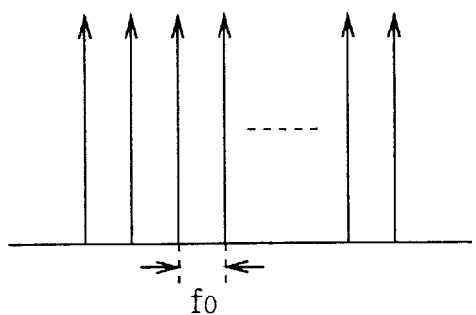
FIG. 6 is a schematic diagram showing subcarrier in an OFDM technique.

FIG. 6 shows the frequency spectrum of transmission waveform in the OFDM scheme. In the OFDM scheme, the transmission signal S11 is subjected to a serial-parallel conversion, and the transmission signal S12 converted into a parallel signal is subjected to an inverse fast Fourier transformation, to allocate the transmission signal S12 to each of the subcarriers which have frequency difference $f_0$ each other and which cross at right angles each other. Conversely, at the time of demodulation, the signal component of a subcarrier every frequency period $f_0$ is fetched and is subjected to the fast Fourier transformation to extract the data being allocated to the above subcarrier.

Figure 7:
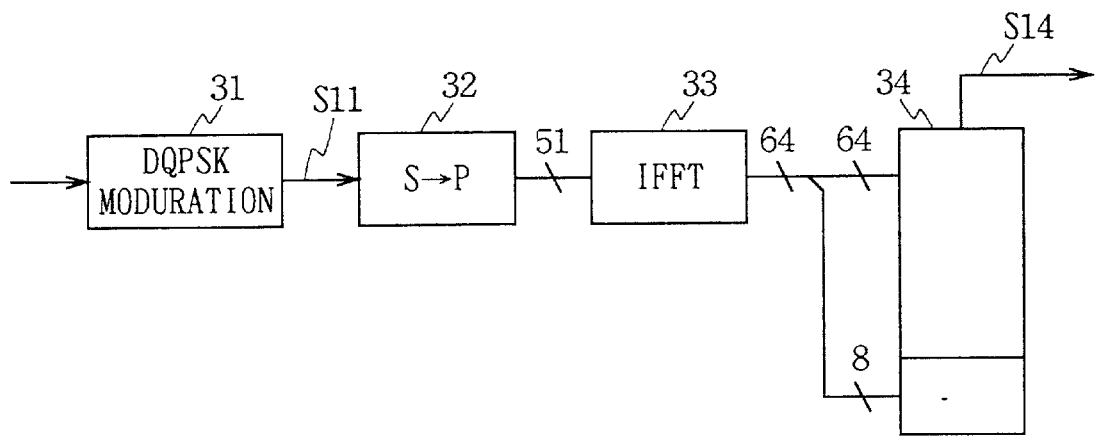
FIG. 7 is a schematic diagram explaining signal processing in the OFDM technique.

Practically, as shown in FIG. 7, in the OFDM scheme, 51 samples of actual data in the transmission signal S11 supplied from a DQPSK modulator 31 is converted into parallel data sequence by a serial-parallel converter 32, and this is sent to an inverse fast Fourier transformer 33.

The inverse fast Fourier transformer 33 maps the parallel data sequence for 51 samples onto the frequency area and moreover, maps invalid data for 13 samples (e.g., invalid bit being "0") onto the frequency area, to generate a part of significant symbol formed of 64 samples, and then adds a guard interval of 8 samples to the part of significant symbol of 64 samples and sends them to a parallel-serial converter 34.

Figure 8:
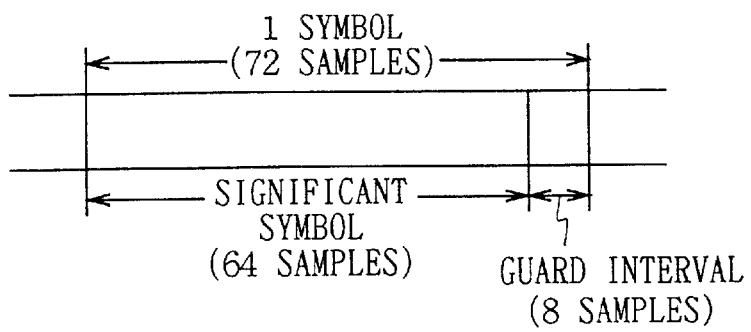
FIG. 8 is a schematic diagram showing the construction of a symbol in the OFDM technique.

That is, as shown in FIG. 8, one symbol is comprised of 72 samples: the part of significant symbol part of 64 samples and the guard interval of 8 samples. In this case, a symbol period $T_{symbol}$ is, e.g., 1.953 [$\mu$sec], a sample period $T_{sample}$ is, e.g., 27.127 [nsec], and a sample frequency $f_{sample}$ is, e.g., 36.864 [MHz].

This OFDM scheme has a characteristic in that since data is transmitted by distributing it to plural subcarriers, a transmission time per one symbol becomes longer, however, since the guard interval is provided on a time axis, it is hardly affected by jitter and multi-paths. Note that, the guard interval is decided to be 10–20% of the length of a significant symbol.

That is, in the OFDM scheme, at the time of demodulation, it is necessary to extract a part of significant symbol from successive received signals and to perform the fast Fourier transformation on it. Even if an error occurs when cutting out the part of significant symbol owing to jitter or the like, the frequency component does not change since the guard interval is provided, but only a phase difference by phase rotation occurs.

Therefore, in the OFDM scheme, demodulation can be performed by inserting data of a given pattern into a signal to correct the phase or by canceling the phase difference by means of differential phase modulation/demodulation system. When only a normal quadri phase shift keying (QPSK)

modulation/demodulation is applied, it is necessary to adjust demodulation timing for every bit, however, in the OFDM scheme, even if there is a shift for several bits, demodulation can be performed but the sensitivity only deteriorates by a few decibels.

Sequentially, the description will be continued returning to FIG. 5 again. A transmission signal S14 outputted from the parallel-serial transformer 34 is supplied to one changeover input terminal 35A of a switch 35. A first PN code $S49_{PN1}$ or a second PN code $S49_{PN2}$ for one period that has been generated by a PN code generator 49 and selected under the control of a controller 45 is supplied to the other changeover input terminal 35B of the switch 35.

This PN code generator 49 is formed of a first PN code generator 49A for generating the first PN code $S49_{PN1}$ being an M sequence (maximum length code) and a second PN code generator 49B for generating the second PN code $S49_{PN2}$ being an M sequence.

Figure 9:
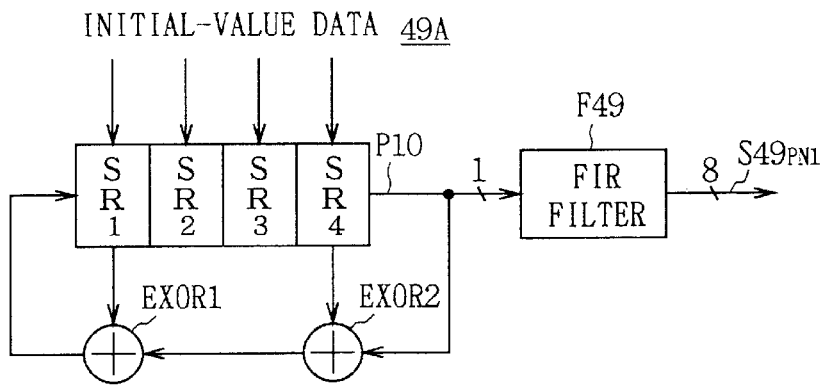
FIG. 9 is a block diagram showing the configuration of a first PN code generator.

As shown in FIG. 9, the first PN code generator 49A serving as the first code sequence generating means is formed of shift registers SR1 to SR4, exclusive OR circuits EXOR1 and EXOR2 for performing exclusive-OR operation on the outputs of the shift registers SR1 and SR4 among the above shift registers SR1 to SR4, and an FIR filter F49.

This first PN code generator 49A stores, e.g., "1, 1, 1, 1", as initial value data, in the shift registers SR1 to SR4, sequentially shifts the initial value data, stored in the shift registers SR1 to SR4, at timings synchronized with a reference clock, e.g., 18.432 MHz and moreover, generates 15-bit (approximately 1 μsec) code sequence P10 in the form of serial data sequence at the speed of 18.432 Mbps and sequentially sends this to the FIR filter F49.

The FIR filter F49 limits a band of the 15-bit code sequence P10 within a prescribed frequency bandwidth, quantizes one bit in the code sequence P10 into 8 chips, and then outputs the first PN code $S49_{PN1}$ in the form of 120 chips (15 bits×8 chip) of parallel data sequence. However, the bit length does not change since the first PN code $S49_{PN1}$ is the one obtained by quantizing one bit in the code sequence P10 into 8 chips.

Figure 10:
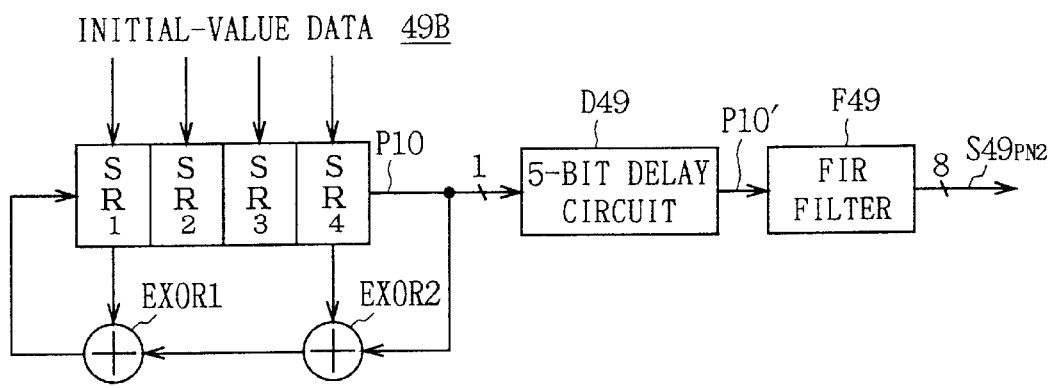
FIG. 10 is a block diagram showing the configuration of a second PN code generator.

As shown in FIG. 10 in which the same reference numerals are applied to corresponding parts to FIG. 9, the second PN code generator 49B serving as the second code sequence generating means sends the 15-bit code sequence P10 to a 5-bit delay circuit D49. The 5-bit delay circuit D49 sequentially sends a code sequence P10', which is obtained by delaying the code sequence P10 for 5 bits, to the FIR filter F49, and outputs the second PN code $S49_{PN2}$ of which the phase is shifted for totally 40 chips (5 bit×8 chip) from that of the first PN code $S49_{PN1}$.

That is, the first PN code $S49_{PN1}$ and the second PN code $S49_{PN2}$ are used as two kinds of independent PN codes since they have the same sequence pattern but are different in phase. The second PN code generator 49B can generate the second PN code $S49_{PN2}$ with a simple configuration in which only the 5-bit delay circuit D49 is provided in the first PN code generator 49A.

Here, the first PN code $S49_{PN1}$ is a PN code for obtaining synchronization between systems, and it is transmitted by the communication terminal controller 12 with the head part of a frame. Furthermore, the second PN code $S49_{PN2}$ is a PN code for obtaining synchronization to specify the demodulation timing when the communication terminal controller 12 and the communication terminals 11A and 11B exchange data according to the time assigned to transmit, and it is transmitted immediately before message data.

Returning to FIG. 5, In the case where the first PN code $S49_{PN1}$ is transmitted as a synchronizing signal between systems or in the case where the second PN code $S49_{PN2}$ is transmitted as a synchronizing signal to specify demodulation timing, the switch 35 switches to the changeover input terminal 35B under the control of the controller 45 and outputs the first PN code $S49_{PN1}$ or the second PN code $S49_{PN2}$. In other cases, it switches to the changeover input terminal 35A and outputs the transmission signal S14.

In this manner, the switch 35 inputs the transmission signal S14, the first PN code $S49_{PN1}$ or the second PN code $S49_{PN2}$ as an output signal S16 to a first transmission means that is comprised of a frequency converter 36, a power amplifier 38, an antenna switch 27 and an antenna 26.

The frequency converter 36 of the first transmission means is a multiplier. It multiplies a local oscillation signal S17 supplied from a phase locked loop (PLL) synthesizer 37 by the output signal S16 to generate a transmission signal S18 having the prescribed frequency converted, and sends this to the power amplifier 38. Note that, for example, 2.4 GHz, 5.7 GHz or 19 GHz, being semi-microwave band, is used as the frequency of the transmission signal S18.

The power amplifier 38 amplifies the transmission signal S18 into a prescribed power level, and sends thus obtained transmission signal S19 to the changeover input terminal 27A of the antenna switch 27. The antenna switch 27 switches a connection to the antenna 26 under the control of the controller 45 depending on transmitting or receiving; in transmitting data, it is switched to the changeover input terminal 27A, and in receiving data, it is switched to the changeover input terminal 27B. Thus, the antenna switch 27 can transmit the transmission signal S19 via the antenna 26.

On the other hand, the radio communication unit 16 sends a receiving signal S20 received via the antenna 26 in receiving data, to a receiving amplifier 39 (generally, called low noise amplifier (LNA)). The receiving amplifier 39, after amplifying the receiving signal S20 into the predetermined level, sends it to a frequency converter 40.

The frequency converter 40 is a multiplier. It multiplies the local oscillation signal 521 supplied from the PLL synthesizer 37 by the receiving signal S20 to generate a receiving signal S22 with a intermediate frequency, and sends this to the serial-parallel converter 41 of an OFDM demodulator 48 serving as a demodulation means.

The serial-parallel converter 41 converts the receiving signal S22 in the form of a serial data sequence into a signal in the form of a parallel data sequence, and sends thus obtained receiving signal S23 to a fast Fourier transformer (FFT) 42. The fast Fourier transformer 42 performs fast Fourier transformation on the receiving signal S23 to generate a receiving signal S24, and sends this to a parallel-serial converter 43. The parallel-serial converter 43 restores the receiving signal S24 to a receiving signal S25 in the form of a serial data sequence, and sends this to a DQPSK demodulator 44.

That is, the OFDM demodulator 48 extracts the part of significant data with the serial-parallel converter 41 and fetches the receiving waveform every frequency period $f_0$ and converts it into parallel data, and performs the fast Fourier transformation with the fast Fourier transformer 42. In this way, the OFDM demodulation is performed.

The DQPSK demodulator 44 performs DQPSK demodulation on the receiving signal S25 to restore receiving data S26 the same as the transmission data S10, and sends this to the communication to controller 30. The communication controller 30 performs error detection based on CRC codes included in the receiving data S26. If the data is right, it outputs the receiving data S26 to the data station 15, and if the data has an error, it does output the receiving data S26 to the data station 15.

Here, in this radio communication unit 16, whole operation is controlled by the controller 45. That is, the radio communication unit 16 transmits and receives data based on the commands from the controller 45, and the communication controller 30 exchanges the transmission data S10 the receive data S26 with the data station 15.

In such a wireless LAN system 10, data is transmitted by a TDMA method with one frame as a transmission unit. That is, the communication terminal controller 12 transmits the first PN code $S49_{PN1}$ to obtain a synchronization between systems in one symbol to be transmitted at the timing of a point $t_0$ at the head of a frame, and then transmits the second PN code $S49_{PN2}$ at the timing of a point $t_5$ based on the time assigned to transmit. The communication terminals 11A and 11B transmit the second PN code $S49_{PN2}$ at the timings of a point $t_7$ and a point $t_9$.

Here, a management data area following the first PN code $S49_{PN1}$ is an area to transmit and receive control information, such as polling data to inquire a request for transmission from the communication terminal controller 12 to the communication terminals 11A, 11B, acknowledge data representing the request for transmission from the above communication terminals 11A, 11B, time data representing a time assigned to transmit to the communication terminals 11A, 11B, and command data to adjust receiving field intensity.

In addition, a packet data area to be transmitted following the second PN code $S49_{PN2}$ is used for that the communication terminals 11A, 11B transmit packet data generated by adding the CRC code to the information data S9 being message data. Note that, as the packet data, the packet length is variable within a prescribed time, more than 3 µsec and less than 4 µsec.

Figure 11:
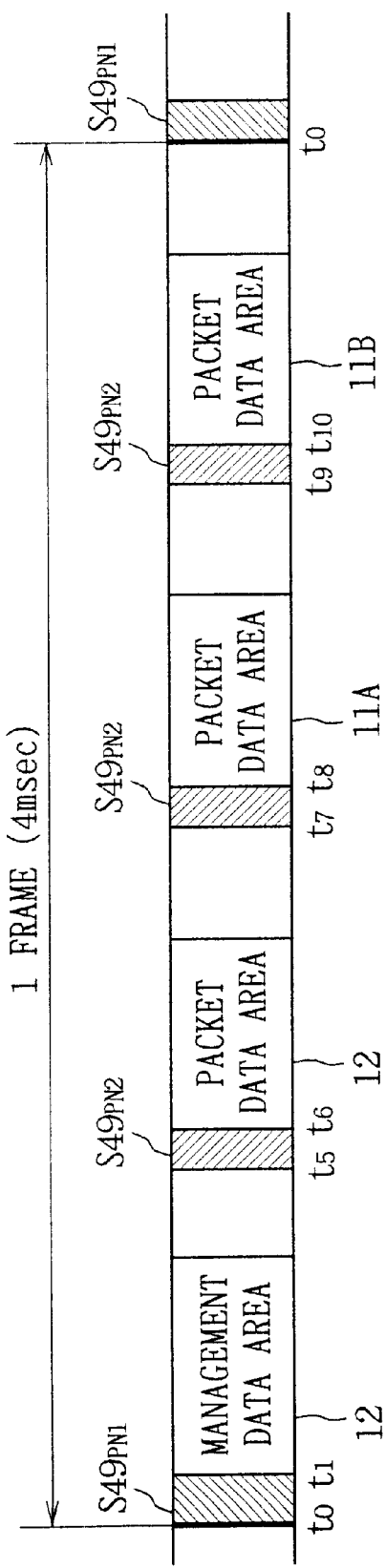
FIG. 11 is a schematic diagram illustrating a frame format.

In this manner, the communication terminal controller 12 has a resource information storing part 25 and a timer 46 in the radio communication unit 16 to transmit data by the TDMA method according to the frame format of FIG. 11.

In the radio communication unit 16, the timer 46 sequentially counts a time for one frame on the basis of the time of transmitting the first PN code $S49_{PN1}$ at the point $t_0$, and thus, the controller 45 detects the time $t_0$ at the head of the next one frame to always transmit the first PN code $S49_{PN1}$ at fixed intervals.

Thereby, the controller 45 transmits the polling data in the management data area after the first PN code $S49_{PN1}$. If the acknowledge data representing the request for transmission is sent from the radio communication units 14A, 14B of the communication terminals 11A, 11B, the above acknowledge data is received and is frequency-converted with the antenna 26, and then it is subjected to the OFDM demodulation and the DQPSK demodulation. Thus, the request for transmission is supplied to the controller 45 via the communication controller 30.

The controller 45 determines the time assigned to transmit to the communication terminals 11A, 11B based on the request for transmission and the amount of remaining communication resource in the resource information storing part 25, that is, remaining time slot information. Then, the controller 45 supplies the control information representing the time assigned to transmit from the communication controller 30 to the DQPSK modulator 31 and the OFDM modulator 47 as the transmission data S10 to demodulate it. Then, the resultant is transmitted from the antenna 26 to the communication terminals 11A, 11B as a transmission signal S19.

(3) Radio Communication Units of Communication Terminal Units

Hereinafter, the description will be made about the radio communication units 14A and 14B provided in the communication terminals 11A and 11B with reference to FIG. 12. Note that, since the radio communication units 14A and 14B basically have the same structure, the description will be made only about the radio communication unit 14A below.

The radio communication unit 14A has a communication controller 51, and exchanges data with the data station 13A via the communication controller 51. The communication controller 51 adds a CRC code for error detection to information data S29 sent from the data station 13A to generate transmission data S30, and sends this to a DQPSK modulator 52. The DQPSK modulator 52 performs DQPSK modulation on the transmission data S10 to generate a transmission signal S31, and sends this to the serial-parallel converter 53 of an OFDM modulator 70 as a modulation means.

The serial-parallel converter 53 converts the transmission signal S31 in the form of a serial data sequence into a transmission signal S32 in the form of a parallel data sequence, and sends this to an inverse fast Fourier transformer 54. The inverse fast Fourier transformer 54 performs inverse fast Fourier transformation on the transmission signal 532 to map it onto the data in the frequency area, and sends thus obtained transmission signal 533 to a parallel-serial converter 55.

The parallel-serial converter 55 restores the transmission signal S33 supplied in the form of a parallel data sequence into a serial data sequence to generate a transmission signal S34, and supplies this to one changeover input terminal 56A of a switch 56. Here, the second PN code $S49_{PN2}$ generated by a second PN code generator 68 has been supplied to the other changeover input terminal 56B of the switch 56. In this connection, the second PN code generator 68 serving as a second code sequence generating means has the same structure as the second PN code generator 49B used in the radio communication unit 16 of the communication terminal controller 12.

Here, the second PN code $S49_{PN2}$ is a PN code for obtaining synchronization to specify the demodulation timing of a receiving end when the communication terminals 11A, 11B exchange data according to the specified time assigned to transmit as described above. And it is transmitted immediately before the above communication terminals 11A and 11B transmit packet data.

In the case of transmitting the second PN code $S49_{PN2}$ as a synchronizing signal to specify a demodulation timing, the switch 56 switches to the changeover input terminal 56B and outputs the second PN code $S49_{PN2}$ under the control of a controller 72. In other cases, it switches over the changeover input terminal 56A and outputs the transmission signal S34.

This switch 56 inputs the transmission signal S34 and the second PN code $S49_{PN2}$ as an output signal S35 to the second transmission means comprised of a frequency converter 57, a power amplifier 59, an antenna switch 60 and an antenna 61.

The frequency converter 57 being the second transmission means is a multiplier. It multiplies a local oscillation signal S36 supplied from a PLL synthesizer 58 by the output signal S35 to generate a transmission signal S37 having the prescribed frequency converted, and sends this to the power amplifier 59. Also in this case, as the frequency of the transmission signal S37, 2.4 GHz, 5.7 GHz or 19 GHz being semi-microwave band is utilized.

The power amplifier 59 amplifies the transmission signal S37 into a prescribed power level, and supplies thus obtained transmission signal S38 to the changeover input terminal 60A of an antenna switch 60. The antenna switch 60 switches a connection to the antenna 61 under the control of the controller 72, depending on transmitting or receiving. In transmitting data, it switches to the changeover input terminal 60A, and in receiving data, it switches to the changeover input terminal 60B. Thus, the antenna switch 60 can transmit the transmission signal S38 via the antenna 61.

On the other hand, in receiving data, the radio communication unit 14A inputs the data to a receiving means comprised of the antenna 61, the antenna switch 60, a receiving amplifier 62 and a frequency converter 63. The radio communication unit 14A sends a receiving signal S39 received via the antenna 61 to a receiving amplifier 62 through the changeover input terminal 60B of the antenna switch 60. The receiving amplifier 62, after amplifying the receiving signal S39 into the prescribed level, sends this to the frequency converter 63.

The frequency converter 63 is a multiplier. It multiplies a local oscillation signal S40 supplied from the PLL synthesizer 58 by the receiving signal S39 to generate a receiving signal S41 with an intermediate frequency, and sends this to the serial-parallel converter 64 of an OFDM demodulator 71 as a demodulation means.

The serial-parallel converter 64 converts the receiving signal S41 into a signal in the form of a parallel data sequence, and sends thus obtained receiving signal S42 to a fast Fourier transformer (FFT) 65. The fast Fourier transformer 65 performs fast Fourier transformation on the receiving signal S42 to generate a receiving signal S43, and sends this to a parallel-serial converter 66. The parallel-serial converter 66 restores the receiving signal S43 to a receiving signal S44 in the form of a serial data sequence, and sends this to a DQPSK demodulator 67.

The DQPSK demodulator 67 performs the DQPSK demodulation on the receiving signal S44 to restore received data S45 that is the same as the transmission data S10, and sends this to a communication controller 51. The communication controller 51 performs error detection based on the CRC code included in the received data S45. If the data is right, the received data S45 is outputted to the data station 13A, and on the other hand, if the data has an error, it is not outputted.

Here, in this radio communication unit 14A, the whole operation is controlled by the controller 72. That is, the radio communication unit 14A transmits and receives data according to commands from the controller 72, and the communication controller 51 exchanges the transmission data S30 or the received data S45 with the data station 13A.

In this case, in the communication terminal 11A, according to the frame format of FIG. 11, after transmitting the first PN code $S49_{PN1}$ for obtaining synchronization from the radio communication unit 16 of the communication terminal controller 12 at the time $t_0$ at the head part of one frame, the second PN code $S49_{PN2}$ is transmitted at the time $t_7$ based on the specified time assigned to transmit, and the second PN code $S49_{PN2}$ sent from the communication terminal 11B is received at the time $t_9$.

That is, the radio communication unit 14A of the communication terminal 11A switches the switch 56 to the changeover input terminal 56B at the time $t_7$ in a frame, to output the second PN code $S49_{PN2}$ for one symbol at the time $t_7$, and switches the switch 56 to the changeover input terminal 56A at the time $t_8$ to output the transmission signal S34 being packet data.

To receive data from a communicating unit and accurately demodulate it by the TDMA method with such a frame structure, the communication terminal 11A is provided with a first correlation detector 69, a second correlation detector 80 and a timer 81 in the radio communication unit 14A.

Practically, the radio communication unit 14A of the communication terminal 11A receives the first PN code $S49_{PN1}$ sent from the radio communication unit 16 of the communication terminal controller 12 at the time $t_0$ at the head of frame via the antenna 61, performs frequency conversion on it with the frequency converter 63, and then sends it to the first correlation detector 69 and the second correlation detector 80 as a receiving signal S41.

The radio communication unit 14A receives the second PN code $S49_{PN2}$ sent following that via the antenna 61, performs the frequency conversion on it with a frequency converter 63, and then sends it to the first correlation detector 69 and the second correlation detector 80 as the receiving signal S41.

The first correlation detector 69 serving as correlation detecting means has detected a correlated value between the received code sequence and a code sequence previously set therein. When a high correlated value is obtained, it is determined that the first PN code $S49_{PN1}$ has been received, and a detection signal S46 is sent to the timer 81.

Figure 13:
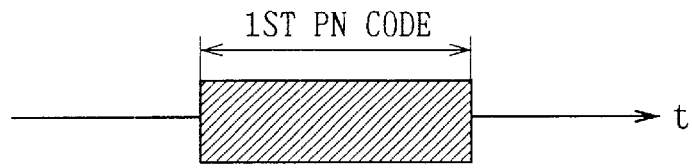
FIG. 13 is a chart showing a communication sequence.

Here, as shown in FIG. 13, the first PN code $S49_{PN1}$ only for one period has been sent, and there is no data before and after the sent first PN code $S49_{PN1}$. Accordingly, the first correlation detector 69 can completely store the first PN code $S49_{PN1}$ in order from the first, at the timing of receiving the first PN code $S49_{PN1}$, and can perform the correlation detection; it can send the detection signal S46 to the timer 81 at the timing of receiving the first PN code $S49_{PN1}$.

Also the second correlation detector 80 serving as a correlation detecting means has detected a correlated value between the received code sequence and a code sequence preset therein, similarly to the first correlation detector 69. When a high correlated value is obtained, it determines that the second PN code $S49_{PN2}$ has been received, and the second correlation detector 80 sends a detection signal S47 to the timer 81.

Also in this case, the second PN code $S49_{PN2}$ only for one period has been sent, and there is no data before and after the sent second PN code $S49_{PN2}$. Accordingly, the second correlation detector 80 can completely store the second PN code $S49_{PN2}$ in order from the first, at the timing of receiving the second PN code $S49_{PN2}$, and can perform the correlation detection; it can send the detection signal S47 to the timer 81 at the timing of receiving the first PN code $S49_{PN2}$.

The timer 81 sends timing information S50 to start a fast Fourier transformation by the fast Fourier transformer 65 of the OFDM demodulator 71 to the controller 72 based on the detection signal S46 supplied from the first correlation detector 69.

Therefore, the controller 72 makes the fast Fourier transformer 65 start the fast Fourier transformation based on the timing information S50, so that it can perform the fast Fourier transformation at the timing when all the parallel data sequence of the receiving signal S42 is inputted in the fast Fourier transformer 65. Thereby, the OFDM demodulator 71 can perform the OFDM demodulation on the control information in a management data area received following the first PN code $S49_{PN1}$ at a correct demodulation timing.

Furthermore, the timer 81 sends timing information S51 to make the fast Fourier transformer 65 of the OFDM demodulator 71 start the fast Fourier transformation to the controller 72 based on the detection signal S47 supplied from the second correlation detector 80.

Therefore, the controller 72 can make the fast Fourier transformer 65 start the inverse fast Fourier transformation based on the timing information S51, and the OFDM demodulator 71 can perform the OFDM demodulation on the packet data in a packet data area received following the second PN code $S49_{PN2}$ at a correct demodulation timing.

Figure 14:
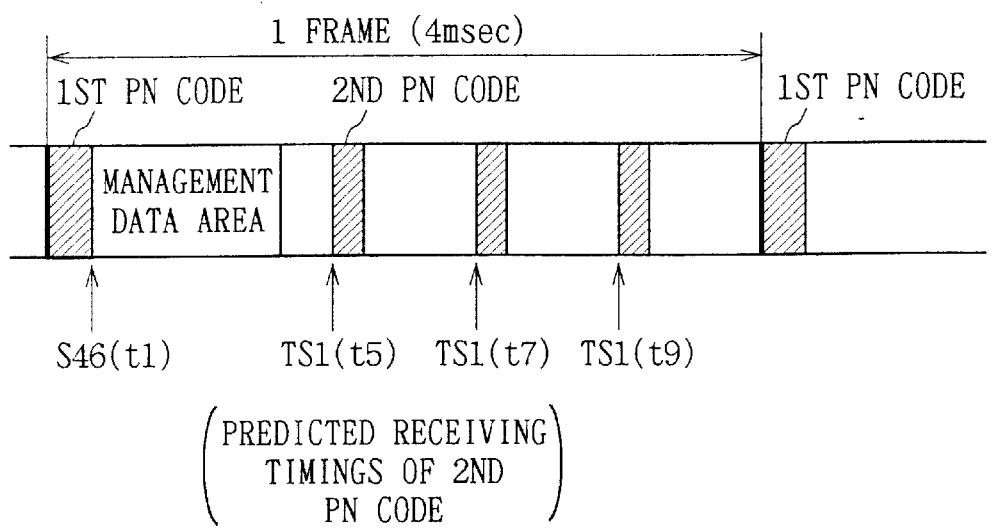
FIG. 14 is a schematic diagram showing a first PN code for one period.

By the way, as shown in FIG. 14, the timer 81 previously predicts the timing of the second PN code $S49_{PN2}$ that should be sent a prescribed time after the above detection signal S46, on the basis of the detection signal S46, and sends the timing information TS1 to the controller 72. The controller 72 compares the timing of the timing information TS1 with that of the timing information S51. When these timings have big difference, it is determined that the detection signal S47 detected by the second correlation detector 80 has been erroneously detected, and the controller 72 controls not to perform the fast Fourier transformation based on the timing information S51.

(4) Operation and Effect

Figure 15:
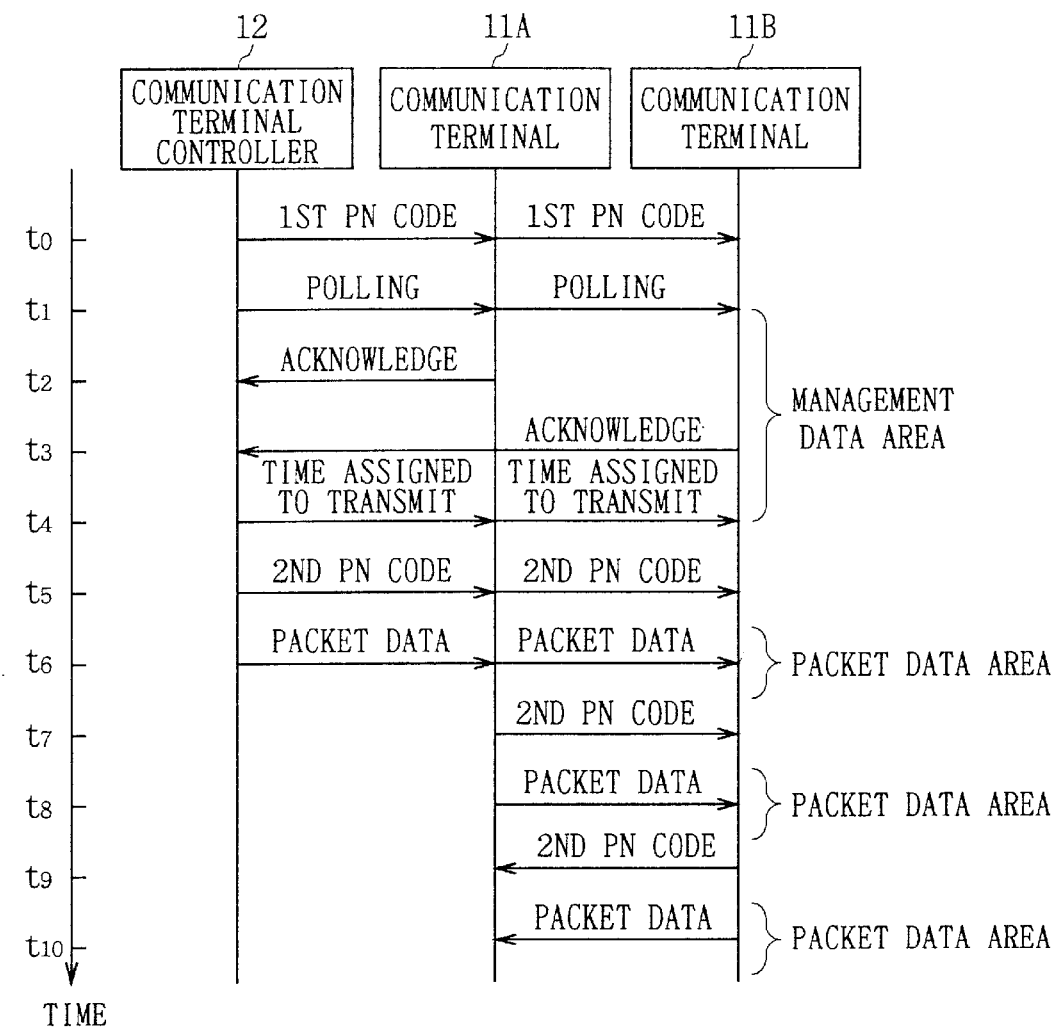
FIG. 15 is a schematic diagram showing the count timing of a timer.

In the above configuration, as shown in a way of communication of FIG. 15, in the wireless LAN system 10 according to the present invention, the communication terminal controller 12 sends the first PN code $S49_{PN1}$ used to obtain synchronization between systems, to the communication terminals 11A and 11B at the time $t_0$, and then sends polling data to inquire the presence or absence of request for transmission to the communication terminals 11A and 11B at the time $t_1$.

The communication terminal 11A, receiving this, sends acknowledge data being a response signal to the communication terminal controller 12 at the time $t_2$ in reply. The communication terminal 11B sends acknowledge data to the communication terminal controller 12 at the time $t_3$ in reply.

Here, for instance, when the communication terminal 11A sends a request for transmission representing data transmission to the communication terminal 11B and the communication terminal 11B sends a request for transmission representing data transmission to the communication terminal 11A, the communication terminal controller 12 determines a time assigned to transmit based on the received request for transmission and transmits this to the communication terminal 11A and the communication terminal 11B as control information at the time $t_4$.

In this case, the communication terminal controller 12 determines the timing to start transmitting its own message data as the time $t_5$, the timing when the communication terminal 11A starts transmitting as the time $t_7$, and the timing when the communication terminal 11B starts transmitting as the point $t_9$.

That is, in the case of transmitting the message data to the communication terminal 11A and the communication terminal 11B, the communication terminal controller 12 sends the second PN code $S49_{PN2}$ to them at the time $t_5$, and also transmits packet data to them at the time $t_6$.

When the time $t_9$ comes, the communication terminal 11B transmits the second PN code $S49_{PN2}$ to the communication terminal 11A, and then transmits the packet data to the communication terminal 11A at the time $t_{10}$. Note that, the time $t_7$ and $t_9$ in the communication terminal 11A and the communication terminal 11B are determined on the basis of the timing of receiving the first PN code $S49_{PN1}$.

In this case, the radio communication unit 16 of the communication terminal controller 12 switches the switch 35 to the changeover input terminal 35B at the time $t_0$ at the head of a frame to output the first PN code $S49_{PN1}$ for one symbol at the time $t_0$, and then switches the switch 35 to the changeover input terminal 35A at the time $t_1$ to output the transmission signal S14 being polling data.

Then, the radio communication unit 16 reswitches the switch 35 to the changeover input terminal 35B at the times $t_5$, $t_7$ and $t_9$ in frames, to output the second PR code $S49_{PN2}$ for one symbol at the time $t_5$, and switches the switch 35 to the changeover input terminal 35A at the times $t_6$, $t_8$ and $t_{10}$, to output the transmission signal S14 being the packet data.

In this manner, in the wireless LAN system 10, the first PN code $S49_{PN1}$ for obtaining synchronization is transmitted from the communication terminal controller 12 to the communication terminals 11A and 11B at the head of frame. Thereby, the control terminal synchronizes with the communication terminals 11A and 11B.

In the case where data is exchanged between the communication terminals 11A and 11B, the communication terminal 11A transmits the second PN code $S49_{PN2}$ representing the demodulation timing to the communication terminal 11B at the prescribed time based on the time assigned to transmit, and then transmits the packet data. The communication terminal 11B transmits the second PN code $S49_{PN2}$ to the communication terminal 11A at the prescribed time based on the following time assigned to transmit and then transmits the packet data.

In this case, for instance, the communication terminal 11A makes the fast Fourier transformer 65 of an OFDM demodulator 71 start the fast Fourier transformation at the time when the second correlation detector 80 detects the second PN code $S49_{PN2}$. Since the second PN code $S49_{PN2}$ only for one period has been sent, the second correlation detector 80 does not have phase shift between the received code sequence and the code sequence preset therein. Therefore, performing the correlation detection once at timing of storing the received code sequence in the shift registers SR1 to SR4 can determine whether the second PN code $S49_{PN2}$ has been received or not.

Accordingly, by demodulating the packet data following the second PN code $S49_{PN2}$ at the timing of determining that the received code sequence is the second PN code $S49_{PN2}$, the communication terminal 11A can always accurately demodulate data irrespective of a delay time $\Delta t1$ that corresponds to the distance between the communication terminal controller 12 and itself, and thus, bit error can be reduced.

Now, since the communication terminal 11A predicts the timing information TS1 of the second PN code $S49_{PN2}$ that should be sent a prescribed time after the time of synchronizing between systems with the timer 81, if the timing of determining the receive of the second PN code $S49_{PN2}$ is largely different from the predicted timing by the timing information TS1, it determines that the second PN code $S49_{PN2}$ has been erroneously detected. In this case, the communication terminal 11A does not perform the fast Fourier transformation with the fast Fourier transformer 65 of the OFDM demodulator 71 under the control of the controller 72, thereby making it possible to prevent demodulation error of data.

In the wireless LAN system 10, the second PN code $S49_{PN2}$ comprised of 120 chips, used to specify a demodulation timing, is transmitted before transmitting packet data, so that transmission capacity can be increased and data is efficiently transmitted because the bit length of the second PN code $S49_{PN2}$ is longer than that of a synchronization bit string in comparison with the case where a synchronization bit string having longer bit length is inserted into packet data as a conventional case.

Further, in the wireless LAN system 10, data is exchanged according to the prescribed time assigned to transmit by means of the TDMA scheme, and at the same time, polling data is transmitted from the communication terminal controller 12 to the communication terminals 11A and 11B to assure a request for transmission. Thereby, a simultaneous transmission by the above communication terminals 11A and 11B can be surely prevented; the responsibility of the system can be further improved.

Furthermore, in the wireless LAN system 10, in case of perform demodulation processing in spite of the erroneous detection of the second PN code $S49_{PN2}$, error can be detected based on a CRC code because packet data is formed by adding the CRC code to message data. Thus, the output of erroneous demodulation result can be prevented.

Figure 16:
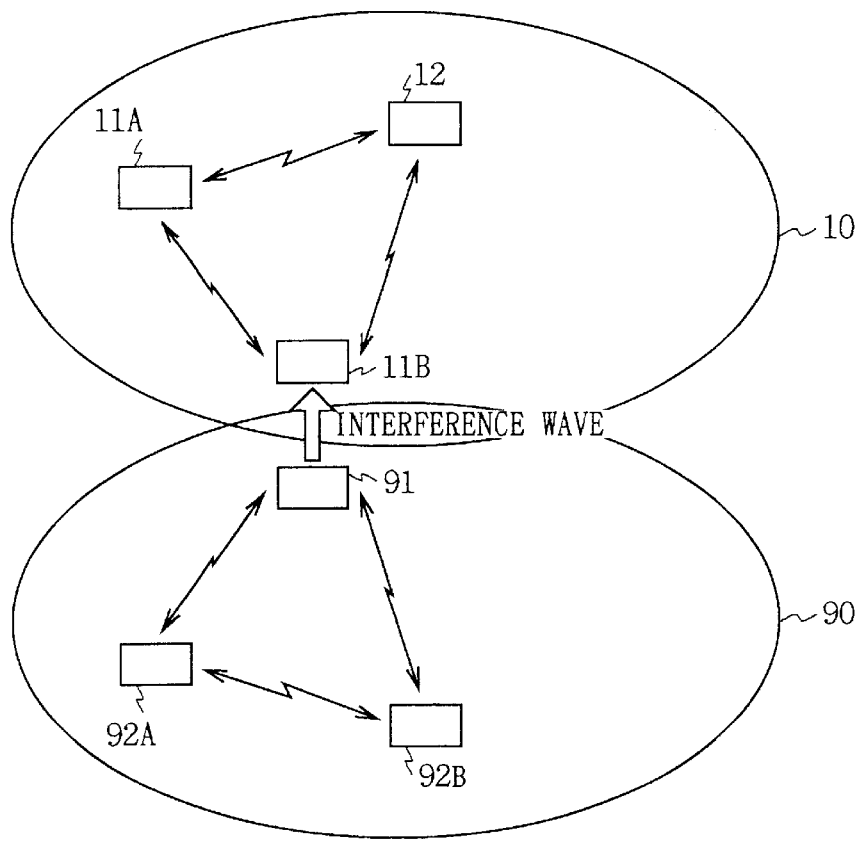
FIG. 16 is a schematic diagram showing a mix of wireless LAN systems.

By the way, as shown in FIG. 16, when another wireless LAN system 90 which is composed of a communication terminal controller 91 and communication terminals 92A, 92B exists near the wireless LAN system 10, radio waves are transmitted from the communication terminal controller 91 of the wireless LAN system 90 to the communication terminal 11B of the wireless LAN system 10 as interference waves.

Figure 17:
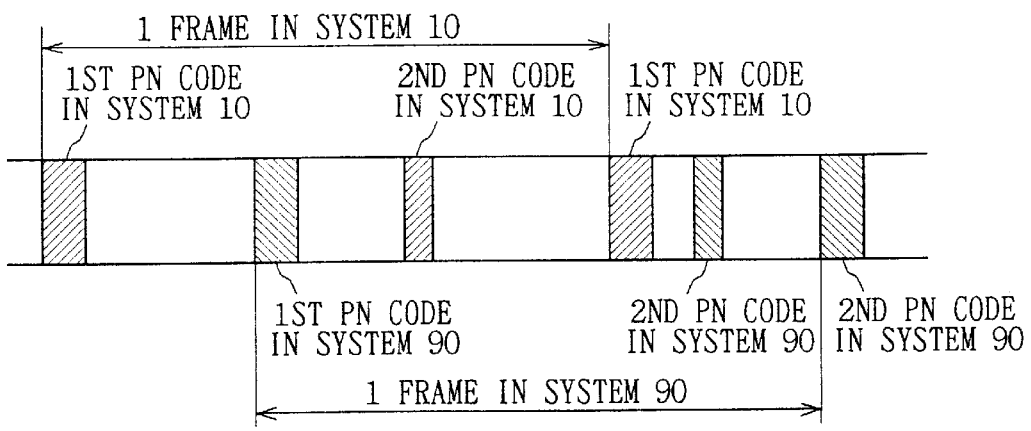
FIG. 17 is a schematic diagram showing a receiving state with interference waves.

As shown in FIG. 17, however, in the wireless LAN systems 10 and 90, by synchronizing between systems using first PN codes mutually different in phase and by transmitting packet data using second PN codes mutually different in phase, the communication terminal 11B cannot detect the first PN code and second PN code used in the wireless LAN system 90 although it detects the first and the second PN codes in the wireless LAN system 10. Therefore, interference waves do not affect data communication.

According to the above configuration, the wireless LAN system 10 transmits the first PN code $S49_{PN1}$ for obtaining frame synchronization at the head of a frame from the communication terminal controller 12, transmits the second PN code $S49_{PN2}$ representing a demodulation timing at the prescribed time based on a time assigned to transmit from the communication terminal 11A (or 11B), and then transmits the packet data being user information. Thereby, the communication terminal 11B (or 11A) which has received those can always accurately demodulate the packet data sent at the prescribed timing after frame-synchronizing between systems.

(5) Other Embodiments

Note that, in the aforementioned embodiment, a first PN code $S49_{PN1}$ and a second PN code $S49_{PN2}$ having the same sequence pattern and mutually differences in phase are generated and used based on a code sequence P10 generated by the first PN code generator 49A and the second PN code generator 49B. However, the present invention is not only limited to this but also a first PN code $S49_{PN1}$ and a second PN code $S49_{PN2}$ having mutually differences in sequence pattern can be generated and used.

In this case, since the second PN code $S49_{PN2}$ having the different sequence pattern from the first PN code $S49_{PN1}$ is generated in the second PN code generator 49B, the 5-bit delay circuit 49D can be omitted. Therefore, the system can be simply configured, provided that the outputs of the shift registers SR2, SR4 are supplied to the exclusive OR circuits EXOR1 and EXOR2 and tap positions are changed.

Furthermore, in the aforementioned embodiment, data communication between the communication terminals 11A and 11B is controlled by the communication terminal controller 12. However, the present invention is not only limited to this but also data communication between the communication terminal controller 12 and the communication terminal 11B (or 11A) can be controlled by the communication terminal 11A (or 11B).

Figure 12:
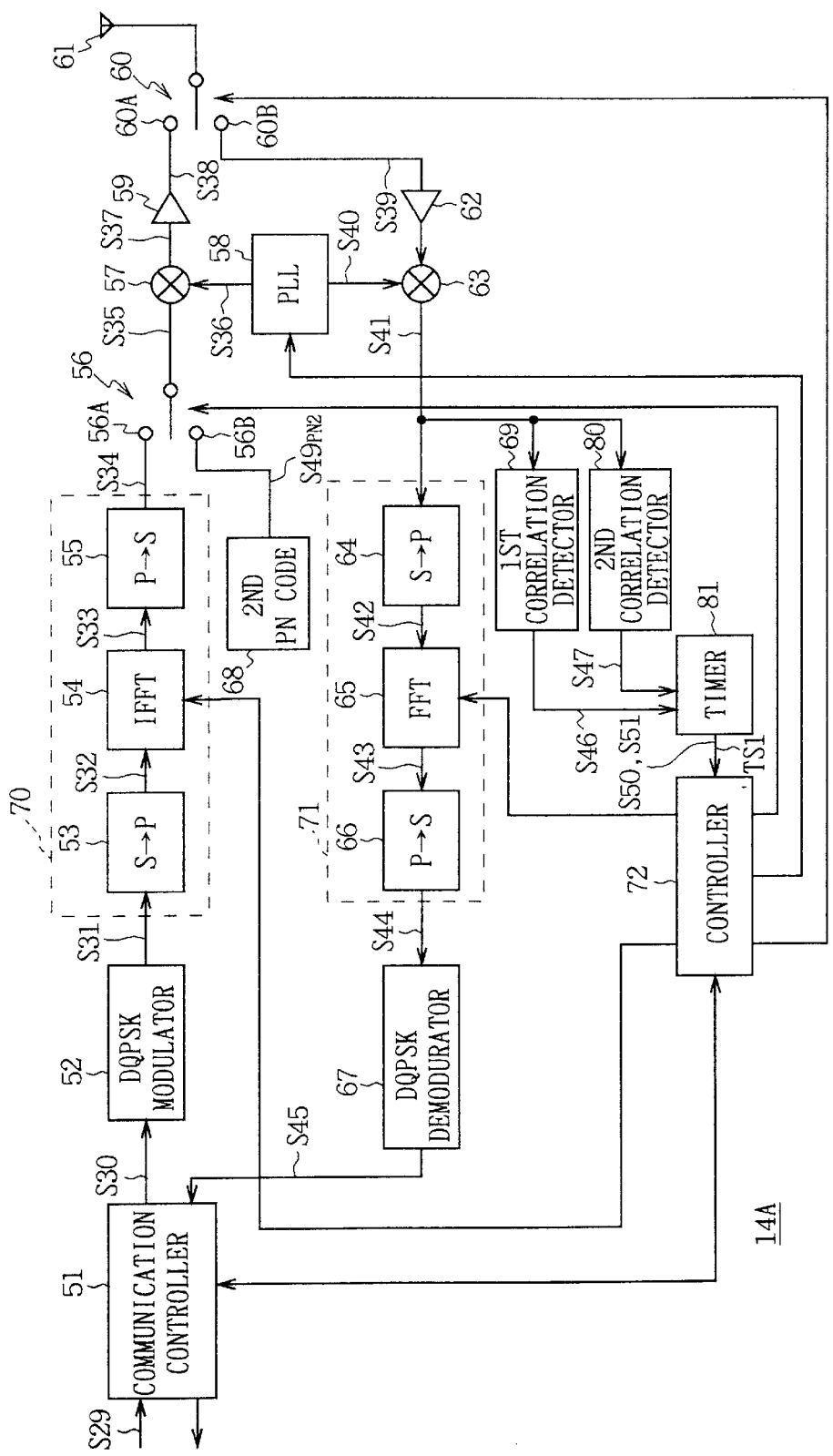
FIG. 12 is a block diagram showing the configuration of the radio communication unit of a communication terminal.
Figure 18:
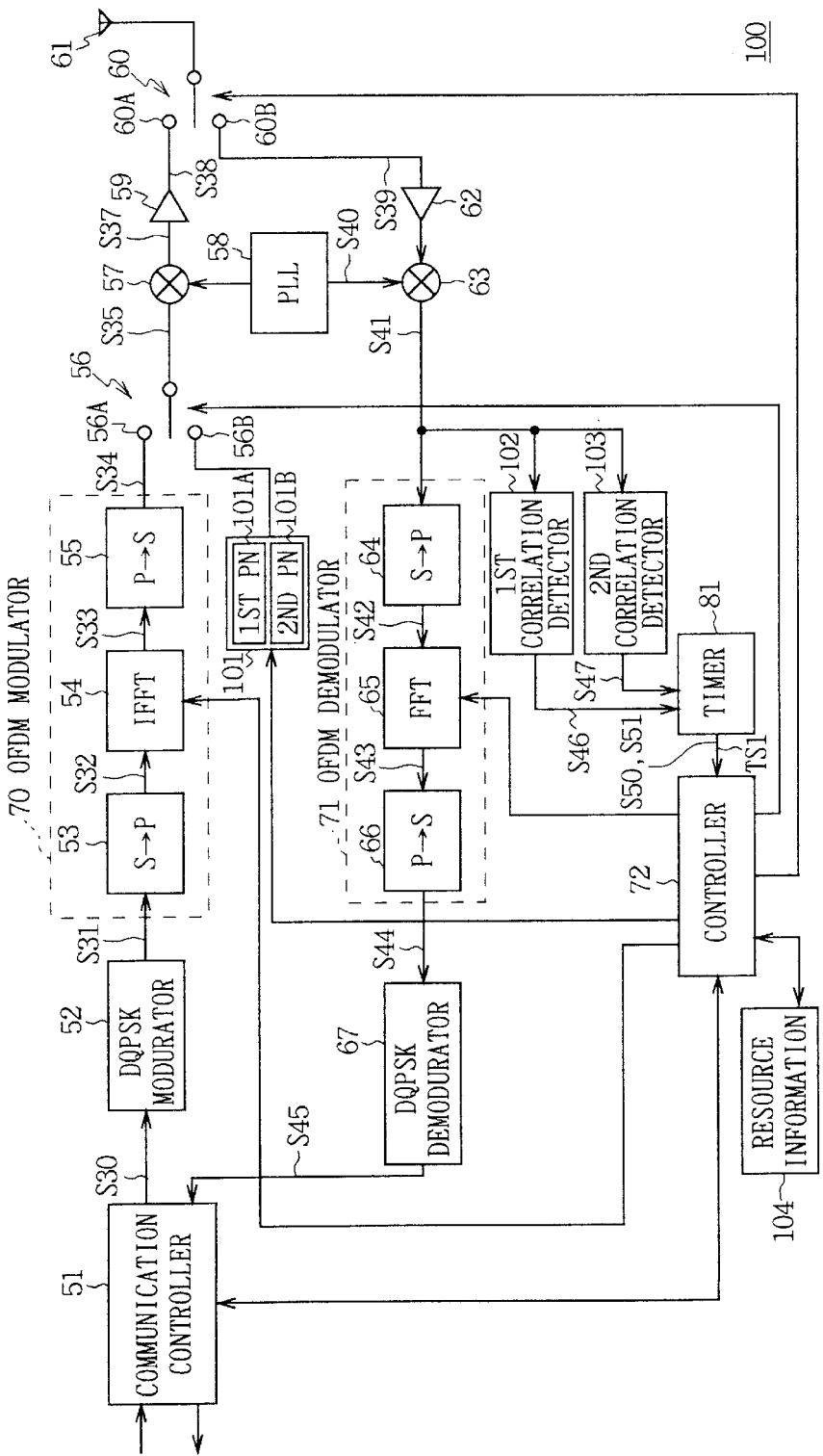
FIG. 18 is a block diagram showing the configuration of a radio communication unit according to another embodiment.

In this case, as shown in FIG. 18 in which the same reference numerals are added to corresponding parts in FIG. 12, each of the communication terminal controller 12, the communication terminals 11A and 11B can have a radio communication unit 100, that is composed of a PN code generator 101 for generating a first PN code $S49_{PN1}$ and a second PN code $S49_{PN2}$, a first correlation detector 102 for detecting the first PN code $S49_{PN1}$, a second correlation detector 103 for detecting the second PN code $S49_{PN2}$, and a resource information storing part 104. And the second PN code $S49_{PN2}$ can be absolutely exchanged between systems via the radio communication unit 100 before transmitting packet data. In addition, since each of the communication terminal controller 12 and the communication terminals 11A and 11B has the radio communication unit 100, data communication can be controlled by the communication terminal having the best communication. Therefore, terminals can be positioned anywhere.

Furthermore, in the aforementioned embodiment, the phase of a 15-bit code sequence P10 is shifted by 5 bits by the 5-bit delay circuit D49 in the second PN code generator 49B composed of four stages of shift registers SR1 to SR4. However, the present invention is not only limited to this but also it can be shifted by any bits from 1 to 14 bits. In this case, the maximum 15 kinds of second PN codes $S49_{PN2}$ can be generated.

Moreover, in the aforementioned embodiment, a 15-bit code sequence P10 is generated in the first PN code generator 49A and the second PN code generator 49B and a first PN code $S49_{PN1}$ and a second PN code $S49_{PN2}$ comprised of 120 chips are generated based on the code sequence P10. However, the present invention is not only limited to this but also a first PN code $S49_{PN1}$ and a second PN code $S49_{PN2}$ comprised of arbitrary number of chips can be generated.

According to the present invention as described above, a communication terminal synchronizes with a control terminal based on a first code sequence sent from the control terminal, and transmits a second code sequence representing demodulation timing for a transmission signal to another communication terminal, and then transmits the transmission signal to the other communication terminal following the above second code sequence. Thereby, the other communication terminal starts demodulation processing based on the demodulation timing obtained by receiving the second code sequence, thereby making it possible to realize a radio communication system capable of always accurately demodulating the received transmission signal.

The control terminal generates a first code sequence to assure a synchronization and transmits it to plural communication terminals to synchronize with the plural communication terminals. After that, a communication terminal transmits a second code sequence representing demodulation timings for a transmission signal to the other communication terminal, and then transmits the transmission signal modulated based on information data. Thereby, a radio communication system capable of always accurately demodulating the received transmission signal can be realized, provided that the other communication terminal starts demodulation processing based on the demodulation timings obtained by receiving the second code sequence.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A radio communication method of exchanging a transmission signal, which has been modulated by a prescribed method based on information data, between plural communication terminals and controlling said plural communication terminals by a control terminal, the radio communication method comprising the steps of:
    causing said control terminal to generate a first code sequence to synchronize with said plural communication terminals and transmitting the first code sequence to said plural communication terminals;
    synchronizing said communication terminal with said control terminal based on a reference timing obtained by receiving said first code sequence, generating a second code sequence representing the demodulation timing for said transmission signal and transmitting the second code sequence to another communication terminal out of said plural communication terminals, and then transmitting said transmission signal to said other communication terminal after transmitting said second code sequence; and causing said other communication terminal to demodulate said transmission signal, received following said second code sequence, based on said demodulation timing obtained by receiving said second code sequence.

2. The radio communication method according to claim 1, comprising the further step of adding an error-detecting code to said information data.

3. The radio communication method according to claim 1, comprising the further step of transmitting said information data as packet data in a unit of variable-length packet.

4. The radio communication method according to claim 1, wherein said first code sequence and said second code sequence have an identical code sequence pattern and are different from each other only in phase.

5. The radio communication method according to claim 1, comprising the further step of transmitting said first code sequence and said second code sequence only for one period.

6. The radio communication method according to claim 1, comprising the further step of causing said plural communication terminals to transmit said second code sequence according to a time assigned to transmit, said time having been individually determined, and transmitting said transmission signal following transmitting the second code sequence.

7. The radio communication method according to claim 6, comprising the further steps of causing said control terminal to inquire of said plural communication terminals about the presence of a request for transmission, and controlling said plural communication terminals based on a response signal to said request for transmission from said plural communication terminals.

8. A radio communication system composed of plural communication terminals that mutually exchange a transmission signal modulated by a prescribed method based on information data and a control terminal for controlling said plural communication terminals, said control terminal comprising:
first code sequence generating means for generating a first code sequence to synchronize said plural communication terminals; and
first transmitting means for transmitting said first code sequence to said plural communication terminals;

each of said plural communication terminals comprising:
second code sequence generating means for generating a second code sequence representing a demodulation timing for said transmission signal;
modulating means for generating said transmission signal by performing a predetermined modulating processing based on said information data;
second transmitting means for transmitting said second code sequence and for transmitting said transmission signal following transmitting the second code sequence;
receiving means for receiving said first code sequence, said second code sequence, and said transmission signal;
correlation detecting means for detecting said first code sequence and said second code sequence received by said receiving means; and
demodulating means for synchronizing with said control terminal based on a reference timing when said correlation detecting means detects said first code sequence, and for demodulating said transmission signal based on said demodulation timing obtained by detecting said second code sequence.

9. The radio communication system according to claim 8, wherein said first code sequence generating means comprises:
a prescribed number of stages of shift registers for sequentially shifting initial value data according to a reference clock;
an exclusive-OR circuit for performing an exclusive-OR operation on bit data read out from each of said stages of shift registers based on said reference clock in a prescribed combination; and
filter means for generating said first code sequence by limiting a frequency band of the code sequence calculated by said shift registers and said exclusive-OR circuit and for quantizing said first code sequence into a prescribed number of chips.

10. The radio communication system according to claim 8, further comprising means for adding an error-detecting code to said information data.

11. The radio communication system according to claim 8, further comprising means for transmitting said information data as packet data in a unit of variable-length packet.

12. The radio communication system according to claim 8, wherein said first code sequence and said second code sequence have an identical code sequence pattern and are different from each other only in phase.

13. The radio communication system according to claim 8, wherein said first and second transmitting means respectively transmit said first code sequence and said second code sequence only for one period.

14. The radio communication system according to claim 8, wherein said plural communication terminals transmit said second code sequence according to an assigned transmit time that has been individually determined, and transmit said transmission signal after the second code sequence.

15. The radio communication system according to claim 14, wherein said control terminal inquires of said plural communication terminals about a presence of a request for transmission, and controls said plural communication terminals based on a response signal to said request for transmission from the plural communication terminals.

16. The radio communication system according to claim 8, wherein said communication terminal comprises:
third code sequence generating means for generating a third code sequence to synchronize the control terminal with said plural communication terminals; and
third transmitting means for transmitting said third code sequence to said plural communication terminals.

* * * * *